United States Patent [19]

Asakura

[11] Patent Number: 4,878,558
[45] Date of Patent: Nov. 7, 1989

[54] FRONT FORK OF A MOTORCYCLE

[75] Inventor: Toshimitsu Asakura, Wako, Japan

[73] Assignee: Honda Giken Kogyo Kabushiki Kaisha, Tokyo, Japan

[21] Appl. No.: 262,589

[22] Filed: Oct. 26, 1988

[30] Foreign Application Priority Data

Oct. 28, 1987 [JP] Japan .................................. 62-270259

[51] Int. Cl.$^4$ ............................................ B62J 13/00
[52] U.S. Cl. .................................... 180/219; 188/344; 280/279; 280/304.3
[58] Field of Search ................. 280/288, 288.4, 152.1, 280/152.2, 281.1, 279, 264, 304.3, 275; 188/24.21, 24.12, 24.19, 24.22, 344; 74/551.1, 551.2, 551.8; 180/219, 84; 296/198

[56] References Cited

U.S. PATENT DOCUMENTS

| 4,093,262 | 6/1978 | Koyama et al. | 280/279 |
| 4,138,132 | 2/1979 | Doyle | 280/304.3 |
| 4,776,422 | 10/1988 | Sakuma | 180/219 |

FOREIGN PATENT DOCUMENTS 59-47587 3/1984 Japan .

Primary Examiner—David M. Mitchell
Assistant Examiner—Anne Marie Boehler
Attorney, Agent, or Firm—Birch, Stewart, Kolasch & Birch

[57] ABSTRACT

A front fork of a bicycle including outer cases disposed above on the side of a vehicle body, inner tubes disposed below on the side of a wheel and telescopically inserted into said respective outer cases, and brake callipers provided at the rear of the bottom end of said inner tube. A protector covering the front of the inner tube therealong, is provided, and the bottom end of this protector is fixedly secured to an axle support member connected to the inner tube. A hose holding member for holding a brake hose is formed on the front surface of the protector, and also there is provided a hose guide member for guiding a brake hose portion extending from the hose holding member up to the brake callipers so as to detour by the side of the inner tube along a route having a larger radius than that of the outer case.

7 Claims, 6 Drawing Sheets

FRONT FORK OF A MOTORCYCLE

BACKGROUND OF THE INVENTION

The present invention relates to a telescopic type of front fork of a bicycle.

As a front wheel suspension device for a motorcycle, normally a telescopic type of front fork has been used. This telescopic type of front fork comprises outer cases and inner tubes telescopically fitted in the respective outer cases, and shock absorber mechanisms are contained in these telescopic structures. And normally, the front fork is disposed between an upper steering handle portion and a lower front axle with the inner tubes placed above and the outer cases (bottom cases) placed below.

Furthermore, in a vehicle provided with a disc brake in association with a front wheel, brake callipers (or calipers) are provided at the lower end portion the front fork, and a brake hose for feeding working fluid to the brake callipers is laid along the front fork. The lower portion of this brake hose is held on the outer surface of the above-mentioned bottom case.

If the above-described outer case is placed above and the inner tube is placed below, the outer circumferential surface of the inner tube, that is, its sliding surface relative to the outer case is apt to be contaminated because it comes near to the road surface. Moreover, layout of the brake hose clear of the sliding surface also becomes difficult.

SUMMARY OF THE INVENTION

The present invention has been worked out in view of the above-mentioned circumstance of the art, and according to the present invention, in a front fork of a bicycle including outer cases and inner tubes telescopically fitted in the respective outer cases with the outer cases disposed above on respective sides of a vehicle body and the inner tubes disposed below on respective sides of a front wheel and provided with brake callipers at the rear of an inner tube's bottom end, a protector is provided for covering the front of the inner tube, the bottom end of the protector is fixedly secured to an axle support member connected to the inner tube, a hose holding member for holding a brake hose is formed on the front surface of the protector, and there is provided a hose guide member which guides the brake hose portion extending from the hose holding member up to the brake callipers so as to detour by the side of the inner tube along a route having a larger radius than that of the outer case.

According to the present invention, since the inner tube positioned below in the proximity of the front wheel has its front face covered by the protector, pebbles, mud and the like would scarcely come into contact with and adhere to the outer circumferential surface of the inner tube. The protector would not prevent expansion and contraction motion of the protector.

And, since the brake hose is held by this protector, and since the portion of the hose extending from the holding section of the protector to the brake callipers at the rear across the inner tube is guided by the hose guide member, the brake hose would not prevent expansion and contraction of the front fork.

Moreover, since the hose guide member detours by the side of the inner tube along a route having a larger diameter than that of the outer case, the bottom end portion of the outer case can pass by the position of this hose guide member and move further downwards, and therefore, a front fork having a sufficient expansion and contraction stroke can be provided.

Still further, owing to the above-mentioned construction, the brake hose can be laid entirely with a downwardly gradient from the top to the bottom, and so, upon maintenance removal of fluid as well as removal of air from the brake hose would become very easy.

Upon off-road running, pebbles may possibly strike not only to the front surface of the front fork but also to the surface extending from the side to the rear. Therefore, in order to deal with this problem, according to one aspect of the present invention, there is provided a protector which covers a front fork over the surface extending from the front surface side of the protector which is subjected to strong impact forces of pebbles is formed to be thick, but the side surface side of the protector which is subjected to weak impact forces is formed to be thin. By making such provision, it is possible to form a protector light in weight, and to design an unsprung weight of the front fork to be small.

DETAILED DESCRIPTION OF THE PREFERRED EMBODIMENTS

Figure 1:
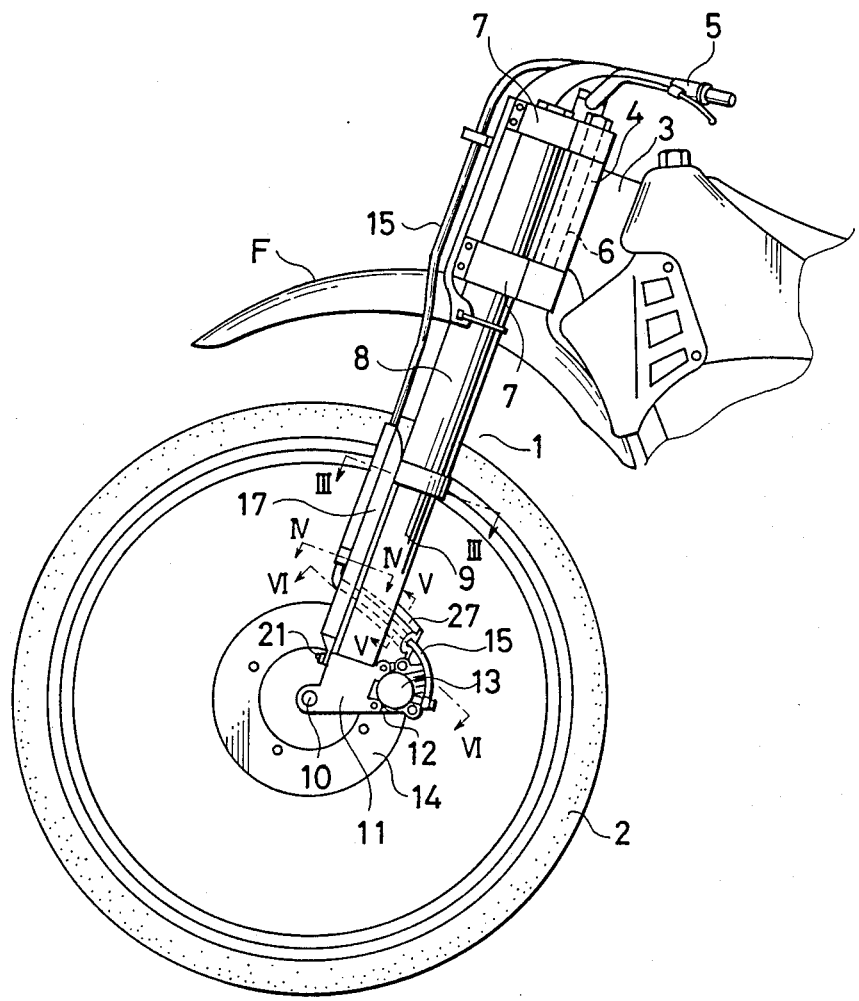
FIG. 1 is a side view of a front portion of a motorcycle showing one preferred embodiment of the present invention.

FIG. 1 is a side view showing a front portion of a motorcycle provided with a front fork 1, a front wheel 2, and a vehicle body frame 3. A steering handle rotary shaft 6 rotated by a steering handle 5 is pivotably mounted to a head pipe 4 provided at the front end of the vehicle body frame 3, and on both left and right sides of upper and lower brackets 7, 7 mounted to the steering handle rotary shaft 6, are fixedly fastened upper portions of outer cases 8 of the above-mentioned front fork 1. A front fender F is fixedly secured to the lower bracket 7 by bolts. The front fork 1 is constructed of these left and right outer cases 8 and left and right inner tubes 9 under the respective outer cases 8, the inner tubes 9 are telescopically fitted in the respective outer cases 8 to form the so-called telescopic type of front fork . The lower end of the inner tube 9 is connected to an axle support member 11 for supporting an axle 10, and provision is made such that during running when a shock applied from the ground surface to the front wheel 2 is transmitted via the axle 10 and the axle support member 11 to the inner tube 9, the shock can be absorbed by a shock absorber mechanism contained within the outer case 8 by the inner tube 9 retreating into the outer case 8.

At the rear of the axle support member 11 are mounted brake callipers 13 via a bracket 12, and a brake disc 14 adapted to cooperate with these callipers 13 is attached to the front wheel 2. As is well known, the brake callipers 13 are provided with a hydraulically operable piston, and the front wheel 2 is adapted to be braked by bringing a friction shoe mounted to this piston into press contact with the above-mentioned brake disk 14. And a brake hose 14 for feeding working fluid to the brake callipers 13 is disposed as extending from a brake lever provided on the steering handle to the brake callipers 13 along the front fork 1.

Figure 2:
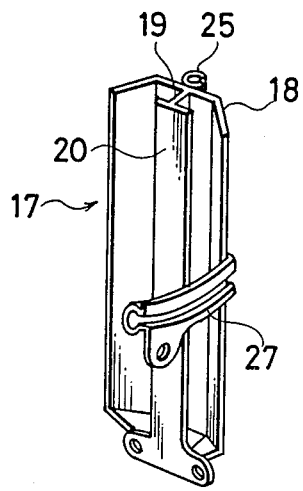
FIG. 2 is a perspective view of a protector in the same preferred embodiment.
Figure 3:
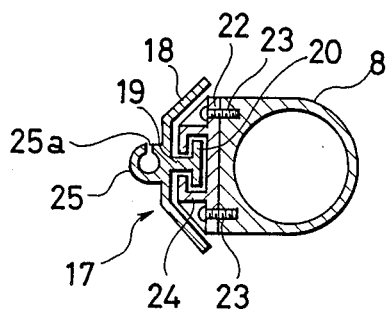
FIG. 3 to 6 are cross-section views taken along lines III—III, IV—IV, V—V, and VI—VI, respectively, in FIG. 1.

In front of the portion of the inner tube 9 projected downwards from the outer case 8, is provided a protector 17, which prevents pebbles, mud and the like from striking against and adhering to the outer circumferential surface of the inner tube 9. As will be seen from FIG. 1 to 3, the protector 17 consists of a cover portion 18 covering the front of the inner tube 9 and a plate-shaped slide piece 20 connected to the cover portion 18 via a connecting piece 19 and extending vertically along the inner tube 9, and has its bottom end fixedly secured to the front surface of the axle support member 11 by means of screws 21. As shown in FIG. 3, a guide member 22 for the protector 17 is fixedly secured to the front surface of the bottom end portion of the outer case 8 by means of screws 23. In this guide member 22 is formed a forwardly projecting box-shaped guide member 24, and in this guide portion 24 is fitted the slide piece 20 of the above-described protector 17 in a vertically slidable manner. Accordingly, the protector 17 is surely held at a portion covering the front surface of the inner tube 9 with its bottom end supported by the axle support member 11 and its upper portion supported by the outer case 8 via the guide member 22. Moreover, since the upper portion of the protector 17 is freely slidable with respect to the outer case 8, the outer case can freely move up and down relatively to the inner tube 9.

On the front surface of the above-described cover portion 18 of the protector 17 is provided a hose holding member 25 along the center line of the front surface as projected therefrom. This hose holding member 25 has a circular tube shape as shown in FIG. 3, and a notch 25a directed in the axial direction is formed on one side of the tube wall. A brake hose 15 is held by the hose holding member 25 by resiliently deforming the hose holding member 25 to open the notch 25a and fitting the above-mentioned brake hose 15 into the hose holding member 25 through this opened notch 25a.

Figure 4:
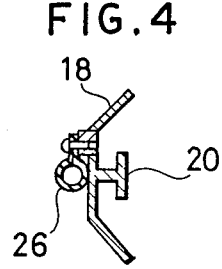
Figure 5:
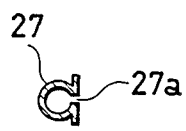
Figure 6:
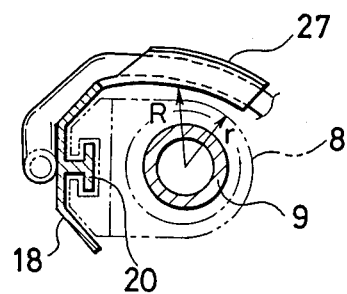

The above-described hose holding member 25 extends from the top end of the protector 17 up to a position deviated downwards in its middle portion, the brake hose 15 extending out from the bottom end of the hose holding member 25 is held by a holding ring 26 (FIG. 4) mounted to the cover portion 18 at the bottom end position, and subsequently it detours by the side of the inner tube 9 and extends towards the brake callipers 13 at the rear. And, a hose guide member 27 for guiding and holding this detour portion is provided. The hose guide member 27 has its rear end portion mounted to the above-described bracket 12, has its front end portion mounted to the cover portion 18 of the protector 17 and thus detours by the side of the inner tube 9, and as shown in FIG. 6, a radius R of the detour is chosen larger than a radius r of the outer case 8. Accordingly, the outer case 8 and the inner tube 9 can freely perform relative expansion/contraction motion without interfering with this hose guide member 27. Similarly to the above-described hose holding member 25, the hose guide member 27 is also formed in a tubular shape, and a notch 27a for mounting the brake 15 is provided on one side thereof (FIG. 5). It is of course possible to form the hose guide member integrally with the protector 17.

In addition, the hose guide member 27 is disposed as directed downwards from the side of the protector 17 to the side of the brake callipers 13 as shown in FIG. 1, and the brake hose 15 extending from the hose guide member 27 is connected to the brake callipers 13 disposed under the hose guide member 27. As a result, the brake hose has a downwards gradient at any portion from its top portion through the protector 17 and the hose guide member 27 down to the brake callipers 13 and has no valley portion, and therefore, removal of fluid or removal of air from the brake hose 15 is extremely easy.

Figure 7:
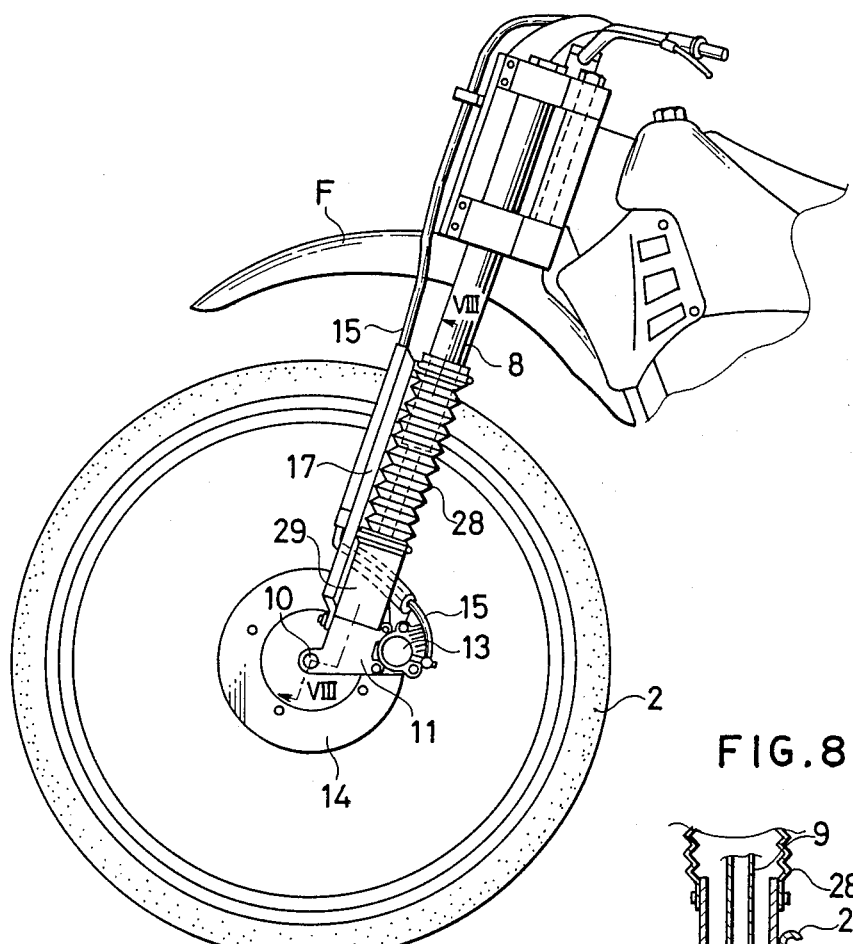
FIG. 7 is a side view similar to FIG. 1 showing another preferred embodiment of the present invention.
Figure 8:
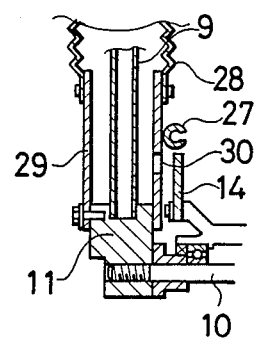
FIG. 8 is a cross-section view taken along line VIII—VIII in FIG. 7.
Figure 9:
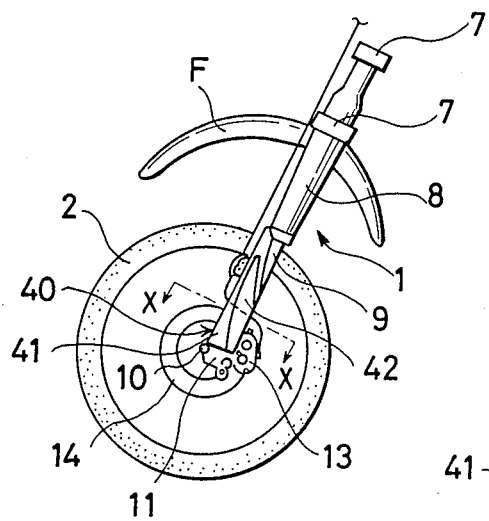
FIG. 9 is a side view similar to FIG. 1 showing still another preferred embodiment of the present invention.

FIG. 7 and 8 show another preferred embodiment of the present invention. In this preferred embodiment, the circumference of the inner tube 9 is covered by expansible bellows 28 to further protect the inner tube 9. To that end, a tubular bellows holder 29 is mounted to the axle support member 11, and the bottom end portion of the bellows 28 is fixedly secured to the bellows holder 29. The top end portion of the bellows 28 is fixedly secured to the bottom end of the outer case 8. As shown in FIG. 8, in the bellows holder 29 is opened a hole 30 at a side portion opposed to the brake disc 14, so that when the bellows 28 expands or contracts, the brake disc 14 can be cooled by air flowing in or out through that hole 30. Since the position of the hole 30 is close to the brake callipers 13 which exert a frictional force upon the brake disc 14, an effective frictional heat dissipation function can be realized. The bellows holder 29 could be divided into two halves to facilitate mounting thereof to the axle support member 11.

FIG. 9 to 13 illustrate still another preferred embodiment of the present invention. In this embodiment also a front fork 1 is an upside-down type front fork similarly to the above-described embodiments, and an inner tube 9 is disposed under an outer case 8 and connected to an axle support member 11 for supporting an axle 10. The outer case 8 is connected to upper and lower brackets 7, 7, the bottom end of the inner tube 9 is formed integrally with the axle support member 11, brake callipers 13 are mounted to that axle support member 11, and a brake disc cooperating with the brake callipers 13 is fixedly secured to a front wheel 2.

Figure 10:
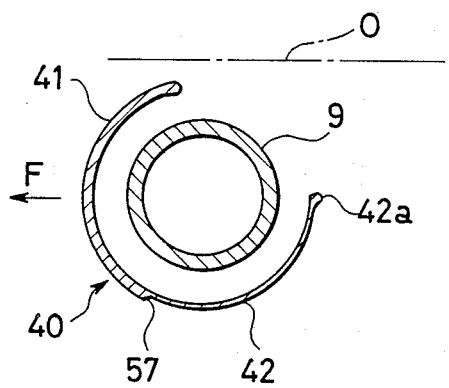
FIG. 10 is a cross-section view taken along line X—X in FIG. 9.

A protector 40 covers the lower portion of the front fork 1 over its front surface to its outer side surface, and as will be apparent from FIG. 10, the surface portion directed to the running direction F, that is, the front surface portion is formed as a thick-walled portion 41, and the surface portion along the outer side surface remote from a center line O of the vehicle body and the rear surface, is formed as a thin-walled portion 42. At the edge of the thin-walled portion 42 is formed a bead 42a for the purpose of reinforcement.

Figure 13:
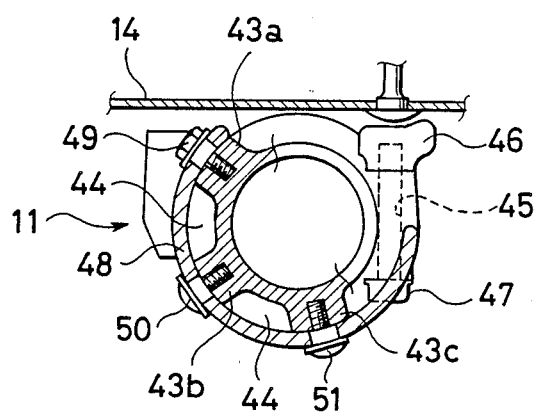
FIG. 13 is a cross-section view taken along line VIII—VIII in FIG. 12.
Figure 11:
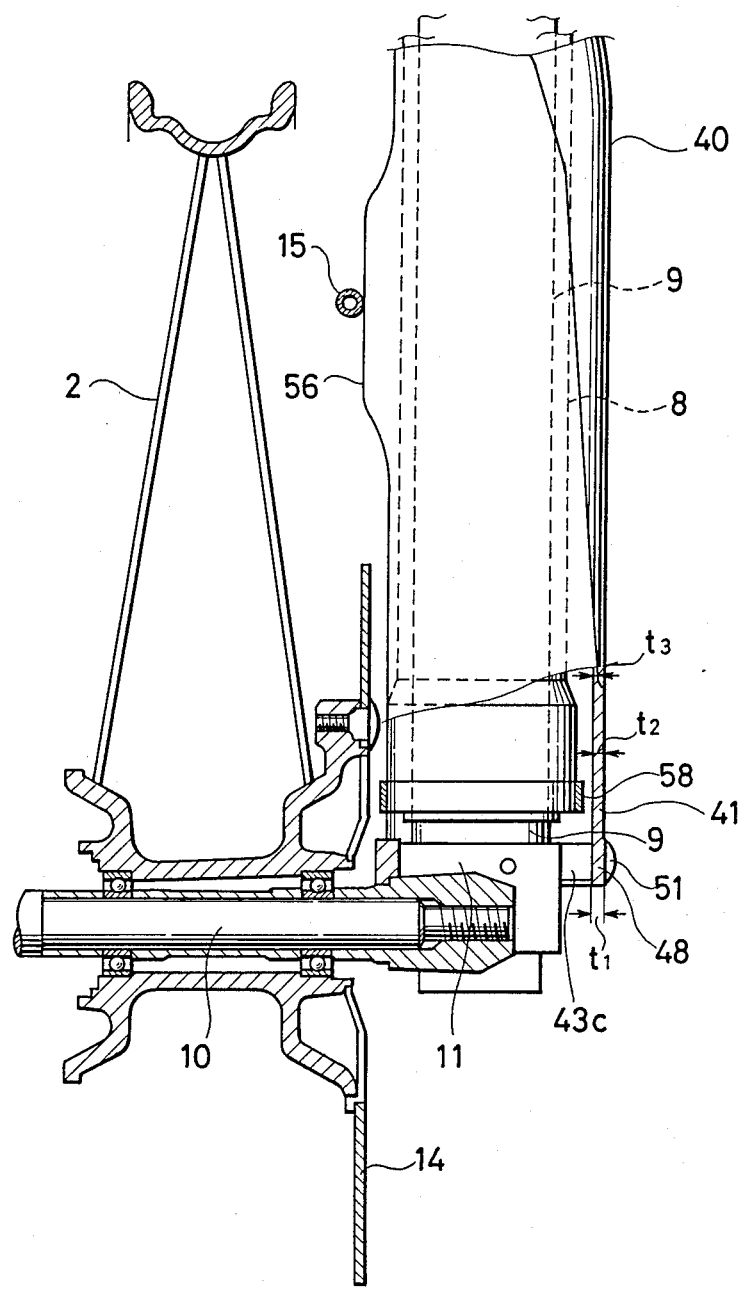
FIG. 11 is an enlarged front view of the preferred embodiment shown in FIG. 9.
Figure 12:
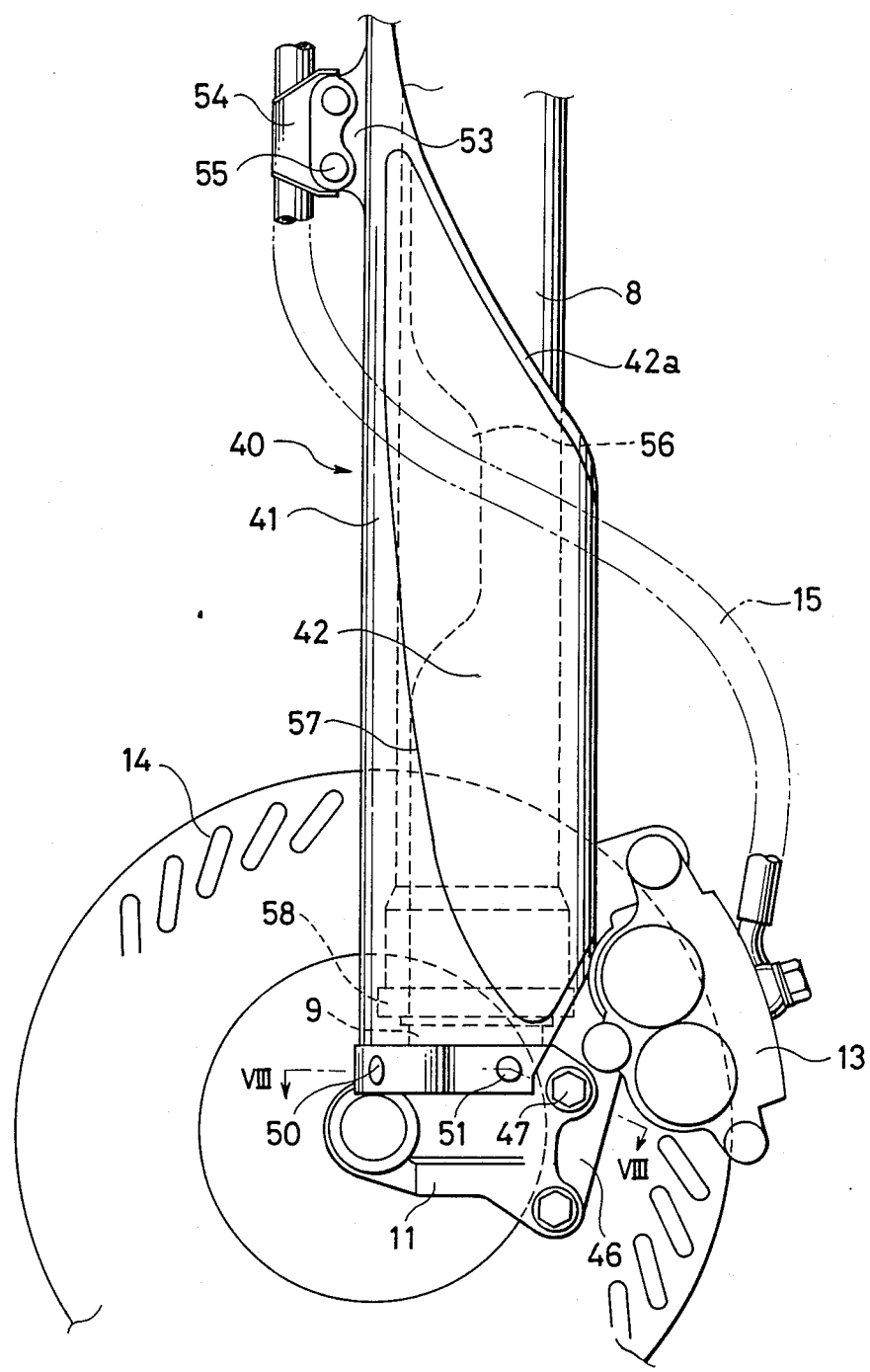
FIG. 12 is an enlarged side view of the same preferred embodiment.

FIG. 11 and 12 show the state where the outer case 8 has descended to the lowermost position. An axle 10 is threadedly mated with an axle support member 11 provided integrally with the inner tube at its bottom end. At the upper side surface of the axle support member 11 are radially projected mount seats 43a, 43b and 43c as shown in FIG. 13, and between the respective mount seats are provided gap spaces 44 for allowing pebbles, mud and the like to drop. In addition, on the rear side are formed mount holes 45 as directed in the tangential direction, and a bracket 46 for mounting brake callipers 13 is connected to the axle support member 11 by means of bolts 47 inserted into the mount holes 45.

At the bottom of the protector 40 is formed a thick-walled mount portion 48 having a thickness $t_1$, and this portion is fixedly secured to the mount seats 43a, 43b and 43c by means of a bolt 49 and screws 50 and 51. A thickness of the thick-walled portion 41 at the front of that protector 40 is $t_2$, at the upper portion of that portion 41 is provided a bracket 53 for holding the brake hose 15 as projected therefrom, and a clamp 54 clamping the brake hose 15 is fixedly secured to the bracket 53 by means of bolts 55. At the middle portion along the height of the thick-walled portion 41 is provided a tongue-shaped hose guide member 56 extending towards the center line of the vehicle body along a circumferential surface to prevent the brake hose 15 from coming into contact with the front fork 1.

The thin-walled portion 42 is the region surrounded by the boundary line 57 of the thick-walled portion 41 and the bead 42a, and has a thickness $t_3$, which thickness $t_3$ is chosen to be about $\frac{1}{2}$ of the thickness $t_2$. The bead 42a and the thick-walled portion 41 have the same thickness and continue to each other in the proximity of the bracket 53.

About the outer circumference of an enlarged diameter portion at the bottom of the outer case 8 of the front fork 1 is fitted a resin ring 58 to prevent the outer case 8 from coming into direct contact with the inner circumference of the protector 40 when the outer case 8 moves up and down.

Relative velocities of pebbles striking against the protector 40 during running are large on the front side and small on the rear side, but as the front portion of the protector 40 is formed as a thick-walled portion 41, it could not be damaged, and as the thin-walled portion 42 at the side portion is subjected to a relatively weak impact force, this portion also could not be damaged. By employing such a construction, the protector 40 can be made light in weight and an unsprung weight of the front fork can be made small. Since the protector 40 is reinforced by providing the bead 42a along the outer edge of the thin-walled portion 42, it is durable.

What is claimed is:

1. A front fork of a bicycle including outer cases disposed above on each side of a vehicle body, inner tubes disposed below on each side of a front wheel and telescopically inserted into said respective outer cases, and brake callipers provided at the rear of the bottom end of said inner tube; characterized in that said front fork comprises an axle support member connected to said inner tube, a protector having its bottom end fixedly secured to said axle support member for covering the front of at least one of said inner tubes therealong, a hose holding member formed on the front surface of said protector for holding a brake hose, and a hose guide member for guiding a brake hose portion extending from said hose holding member down to said brake callipers so as to detour by the side of said inner tube along a route having a larger radius than that of said outer case.

2. A front fork as claimed in claim 1, wherein said hose guide member is composed of a tubular body extending from said protector down to the proximity of said brake callipers so as to detour by the side of said inner tube and having a notch to be used for mounting a brake hose.

3. A front fork as claimed in claim 1, wherein the upper portion of said protector is designed to be vertically slidable as guided by a guide member provided on said outer case.

4. A front fork as claimed in claim 1, wherein the circumference of said inner tube is covered by expansible bellows, and the bottom end of said bellows is fixedly secured to a bellows holder mounted on the axle support member.

5. A front fork as claimed in claim 1, wherein said hose guide member is composed of a tongue-shaped member extending in a circular arc shape from said protector towards the side of said inner tube.

6. A front fork as claimed in claim 1, wherein said protector covers said inner tube from its front surface to the side thereof, and the side of the front surface is formed to have a thick wall, while the side of the side surface is formed to have a thin wall.

7. A front fork as claimed in claim 1, wherein said outer case is supported from the side of the vehicle body by upper and lower brackets, and a front fender is fixedly secured to the lower bracket.

* * * * *